Patented Jan. 2, 1923.

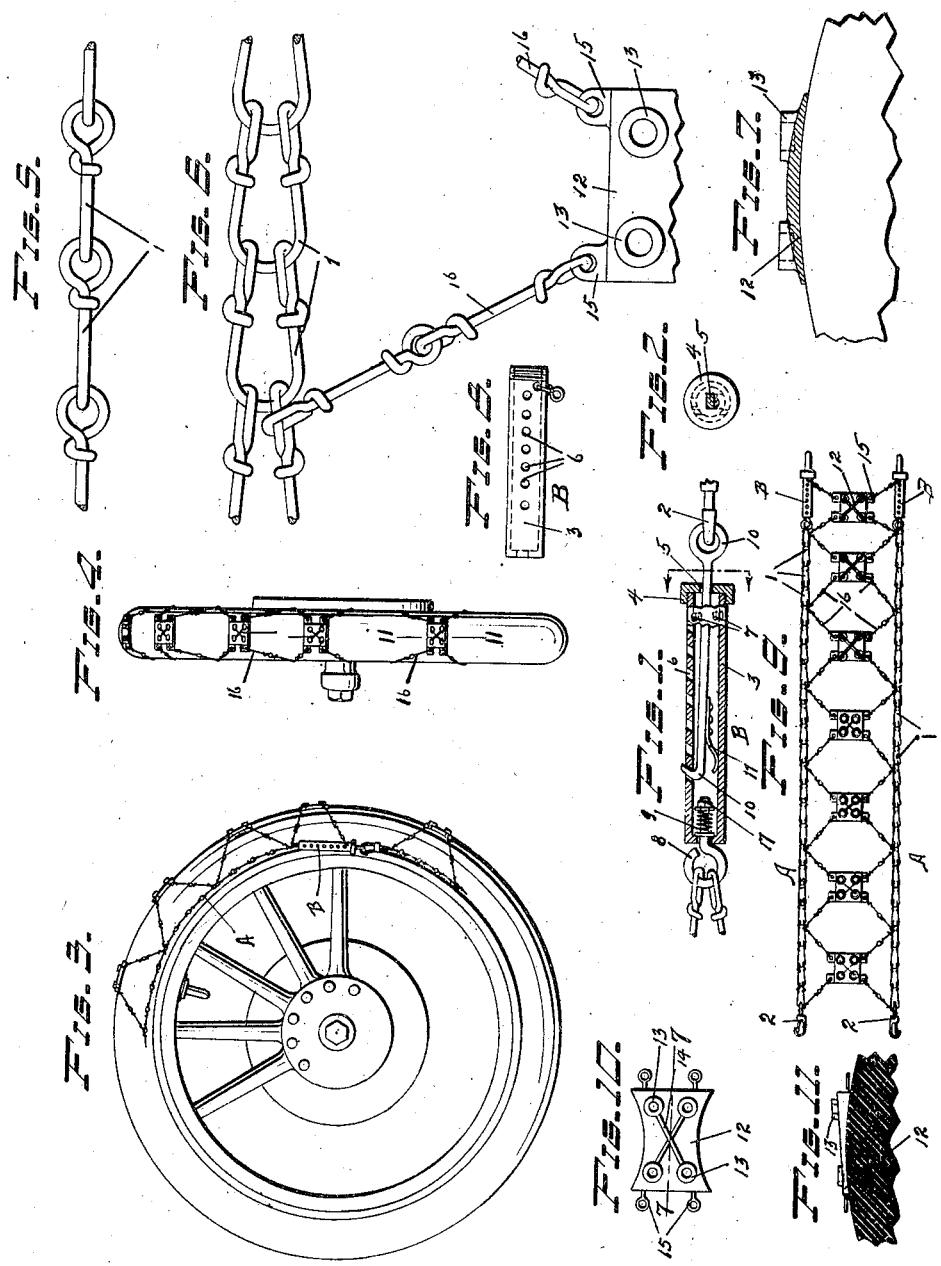

1,440,591

UNITED STATES PATENT OFFICE.

HENRY M. FULLER AND HARDY K. DOWNING, OF SALT LAKE CITY, UTAH.

TIRE-CHAIN TIGHTENER.

Application filed March 14, 1922. Serial No. 543,590.

*To all whom it may concern:*

Be it known that we, HENRY M. FULLER and HARDY K. DOWNING, citizens of the United States, residing at Salt Lake City, in the county of Salt Lake and State of Utah, have invented certain new and useful Improvements in Tire-Chain Tighteners, of which the following is a specification.

Our invention relates to tire chains, and has for its object to provide a tight fitting tire chain with a portion forming an armor which chain when assembled is an endless chain, with portions so constructed that the chain may be secured on and taken off of a tire without separating the ends of the chain.

These objects we accomplish with the device illustrated in the accompanying drawings in which similar letters and numerals of reference indicate like parts throughout the several views and as described in the specification forming a part of this application and pointed out in the appended claims.

In the drawings in which we have shown a substantial embodiment of our invention, Figure 1 is a longitudinal section of the socket for adjusting the chain to the tire. Figure 2 is an elevation of the screw cap for said socket. Figure 3 is an elevation of an automobile wheel with a portion of our device in place thereon. Figure 4 is an edge elevation of the same. Figure 5 is a plan of a short section of the side chain. Figure 6 is a plan of the same chain section looking from another direction and with a portion of one of the armor plates and links connecting it with the chain. Figure 7 is a transverse section of the armor plate on line 7—7 of Figure 10 shown in position on the tread of a tire. Figure 8 is an elevation of the chain socket. Figure 9 is a plan of the chain before it is connected. Figure 10 is a plan view of one of the armor plates. Figure 11 is a circumferential section of one of the armor plates, on line 11—11 of Figure 4.

The present invention consists of two side chains A, portions of which are shown in Figures 5 and 6, made up of interlocking links 1. On one end of each of said chains A is provided a snap 2, and on the other end of each of said chains A is fastened the socket member B. The said socket members each consists of a cylindrically-shaped cup 3, which is externally threaded at one end, and perforated in its bottom or other end. A cap 4 is screwed on the threaded end of said cup as a closure therefor, which cap has a slotted hole 5 in its bottom. A number of holes 6 are bored in the side wall of said cup 3, and an inwardly projecting lug 7 is formed on the inner wall of said cup. An eye bolt 8 is inserted through the perforated bottom of said cup 3 and on which is carried a spring 9 to normally hold the eye of said bolt in contact with the bottom of said cup 3. An eye hook 10 is passed through the slot in the said cap 4, which hook portion is to be detachably engaged in the holes 6 of said cup when the device is assembled. A spring 11 is fastened on one side of said hook to normally hold said hook in the holes 6. The said snaps 2 are to be engaged in the eye of said hook 10.

The armor plates 12 are made of metal and each consists of a rectangularly-shaped plate having cup-shaped lugs 13 extended from the face side with ribs 14 connecting diagonal pairs of said cups, and with the rear edge thicker than the front edge. Two extending eye lugs 15 are provided in each end edge of said plates 12. The stay chains 16 connect the said plates 12 with the side chains A, by one link of said stay chains being engaged with the said eye lugs 15, while another link is engaged in the links 1 of the adjacent chain A. The stay chains are positioned at an angle to said chains A, and when the device is assembled the said stay chains will hold the armor plates on the tread of the tire with the stay chains 16 tensioning at angles and acting as braces or stays. The tread face of the armor plates 12 is smooth and the said eye lugs 15 are spaced from the tire face to prevent any injury to the tire by the lugs or plates while allowing a close fit of the tread portions of our chain with the tire face or tread.

The assembling and use of our device is as follows:—The socket members B are assembled by inserting the eye bolts 8 through the perforated bottom of the cups 3 the springs 9 are passed on the bolt end and the nuts 17 are screwed on said bolts 8 with slight tension of the spring 9. The eye hooks 10 are inserted through the rectangularly-shaped slots 5 of the caps 4, the hook is then formed and when said hook is inserted within said cup 3 the hook is to be engaged in the hole 6 nearest the threaded end of said cup 3, the cap 4 is then screwed partially on said cup, omitting the last one-half turn, when the snaps 2 are engaged in the eye portion of said eye hooks 10 of each of said side chains A the endless feature of our chain is established, as the chains are still long enough to be placed over the tread of the inflated tire. After the device is on the tire the chains may be tensioned by pushing the said eye hook 10 further into the said cup 3 and when so inserted as far as the tension of the chains A will permit, the hook 10 will enter the nearest hole 6 and retain the device in close contact with the tire. To remove the device the tensioning member B is moved manually toward the eye portion of the hook 10, this movement will push the hook out of the hole 6 and then by moving said member 10 as a lever fulcrumed in the cap 4 the spring 11 will be compressed and the member 10 may be moved longitudinally within the cup 3 and the tension on the chains A released and the device removed from the wheel without entirely severing or breaking the entirety of either chain A. The position of the lugs 7 within the cup 3 will allow the cap 4 to be partially rotated to bring the hook 10 out of the line of holes 6 and when the said cap is turned up on the threads the hook will be in alinement with the line of holes 6, and may engage within any of said holes as the tension of the chains A allow.

We thus provide a new and novel tire chain and armor having the specially new features of lengthening an endless chain without breaking the continuity, a novel tightening means for tensioning tire chains and a tire armor plate conforming closely with the tread of a tire and with connections to tightening chains which will retain the armor plates in position and provide a road engaging feature that is new on armor plates.

Having thus described our invention, we desire to secure by Letters Patent and claim:—

1. In a tire chain tightener the combination with an elongated tubular member having an apertured end wall at one end and a cap at the other, a plurality of alined apertures in said tubular member, an eye bolt carrying a spring and slidable in the apertured end wall of said tubular member, and an eye hook slidable in said cap and adapted to engage in any of the apertures of said tubular member to take up portions of the slack of side chains, while other portions of said slack are taken up by said eye bolt.

2. A chain tightener consisting of an elongated tubular member having an apertured end wall and a plurality of alined apertures in a side, an apertured cap screwed on the other end of said tubular member, an eye bolt operable through the apertured end of said member, a spiral spring carried on said eye bolt tensioned by a nut on said bolt and the end of said member, an eye hook slidable in said cap and adapted to engage in any of said alined apertures, and coact with said eye bolt to tighten a side chain, with a spring on said eye hook to yieldingly retain said hook in engagement with said tubular member.

In testimony whereof we have affixed our signatures.

HENRY M. FULLER.
HARDY K. DOWNING.